Oct. 22, 1963     H. T. JOHNSTON, JR     3,107,529
THERMOSCOPE
Filed Dec. 23, 1960
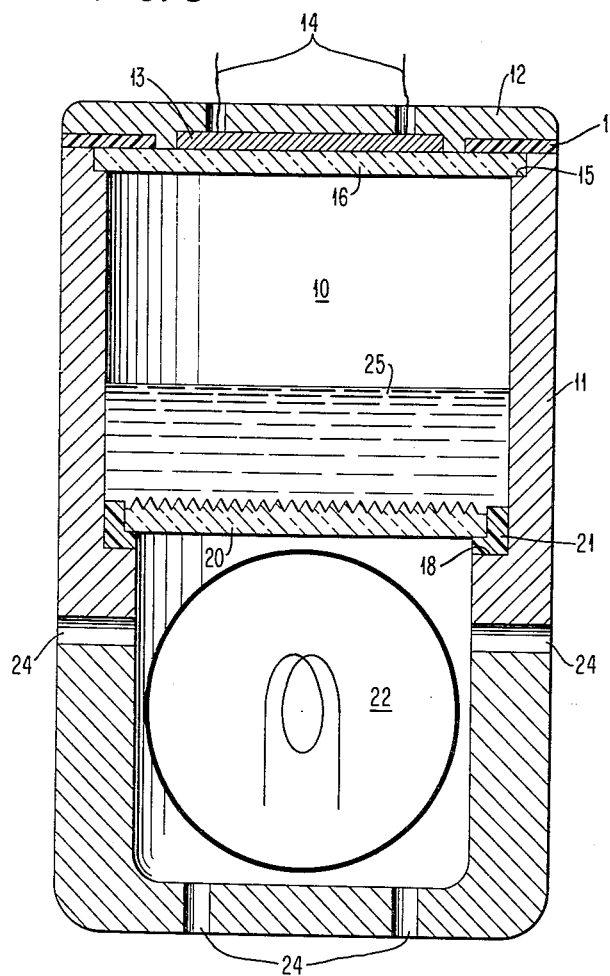
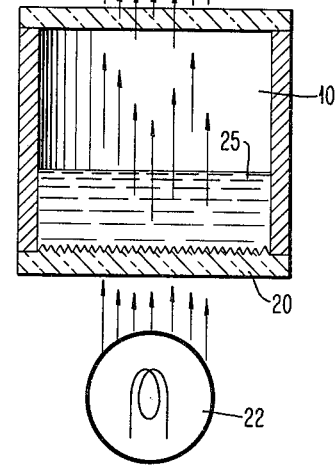
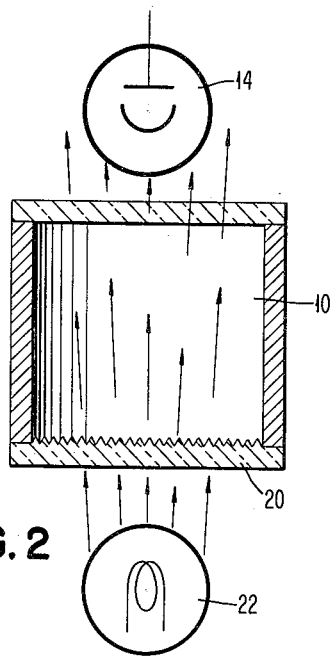
INVENTOR
HOWARD T. JOHNSTON JR.
BY *J. L. Sterling*
ATTORNEY 3,107,529
THERMOSCOPE
Howard T. Johnston, Jr., Poughkeepsie, N.Y., assignor to International Business Machines Corporation, New York, N.Y., a corporation of New York
Filed Dec. 23, 1960, Ser. No. 78,021
2 Claims. (Cl. 73—339)

This invention relates to a thermoscope and more particularly to one using liquid vaporization as its controlling factor.

In a modern electronic computer the heat created by the components is considerable. Circulating air, oil baths and other methods are used to dissipate the heat, slight variations of which can damage or cause a malfunction of the device. Signals indicating a sudden rise in temperature are needed to enable either the cooling mediums to step up their action or to shut down the defective portion of the computer to prevent damage.

It is therefore the principal object of this invention to provide a thermoscope that is accurate and effective within close limits.

A further object is to provide a device in which light intensity is varied by a temperature change.

Another object is to provide an accurate and simple detection device that is actuated by the evaporation of a liquid.

The foregoing and other objects, features and advantages of the invention will be apparent from the following more particular description of a preferred embodiment of the invention, as illustrated in the accompanying drawing.

In the drawing:

FIG. 1 is a schematic showing of the invention in which the path of the light rays is shown indicating a normal condition.

FIG. 2 is similar to FIG. 1 with the device indicating an overheated condition.

FIG. 3 is an enlarged cross sectional view showing the invention in an inactive condition.

The operation of this invention relies on the fact that light, passing through a medium having one roughened surface, such as that of frosted glass, is deflected or diffused and does not have the same intensity as it would have if passed through a glass having smooth or non-deflecting surfaces. In implementing the invention, a thin film of vaporizable liquid is placed over an area of roughened glass. The liquid then forms a flat plane or non-diffusing area and if the liquid and glass are transparent the light will pass through. If, however, this liquid is vaporized by heat, the roughened or diffusing surface is exposed and light of the same intensity will no longer pass through since the glass is now translucent. The arrows of FIGS. 1 and 2 representing light rays illustrate this action. In order to use this principle, a lamp and a photocell are placed one above, the other below, a closed chamber of transparent material, the bottom of which is roughened. A liquid that vaporizes at a predetermined temperature is introduced in the chamber and covers the roughened surface.

A sample configuration of the invention is shown in FIG. 3. A chamber 10 formed of a casing 11 of any heat conducting material such as glass, metal or the like is provided with a cover 12 having a depression therein to accommodate a light sensitive cell 13 of selenium or other material. The cover is provided with holes for the wires 14 of the cell.

A shoulder 15 formed in the wall of the chamber supports a glass partition 16 that protects the light cell from the vaporized liquid. A ring 17 of rubber or other material further protects the cell and seals the chamber 10.

A second shoulder 18 on the wall of chamber 10 has a similar rubber gasket 21 that seals a glass plate 20 in place to form the bottom of chamber 10. The upper surface of plate 20 is roughened, by etching or other means, making it translucent in normal usage. The lower portion of casing 11 has a lamp 22 therein which is covered by a bottom cover 23 for the casing 11. Vents 24 provide ventilation for the lamp.

Under normal conditions a film of liquid 25 costs the roughened surface of the frosted or etched glass 20. Under these conditions the light from lamp 22 will pass undeflected through the glass 20, film 25 and glass 16 to actuate the light sensitive cell 13. The path and action of the light rays is seen in FIG. 1. The characteristics of the cell are such that it will operate only on full light from the lamp.

By selecting fluids with different boiling points, different temperatures may be selected. Also by combining liquids in certain proportions the indicating temperature can be accurately controlled.

When the boiling point of the liquid 25 is reached it vaporizes uncovering the roughened surface of glass 20. This causes the light to be diffused reducing the intensity of the light reaching the cell 14. When the light necessary for operating the cell is lowered below that value the cell no longer generates current.

It is obvious that many materials other than glass such as clear plastic may be used for members 16 and 20. Also the casing 11 may be transparent to permit the lamp 22 to be located at the side of the casing in a position where the light would be reflected from the surface of the liquid instead of passing through.

The speed of operation of the device may be varied by using different amounts of the liquid and varying the volume of the chamber 10.

It is to be noted that the index of refraction of the material of the container must be near that of the liquid to attain the best results.

This device may also be used to detect vibration. As the surface of the liquid 25 ripples under vibration there will be a point at which the full intensity of the light either reflected or passing through will activate the cell. By calibrating the photocell this point can be measured.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A temperature responsive device comprising a light source adapted to energize a light sensitive cell, a chamber disposed in the light path between said source and cell having one wall made translucent by roughening to limit the light such that said cell is not energized and means effective over a preselected temperature range for rendering said wall transparent to permit operation of said cell after which the translucent condition of said wall is restored by vaporizing said means.

2. The temperature responsive device comprising a light source adapted to energize a light sensitive cell, a transparent chamber having one wall made translucent by roughening to limit the light by said source such that said cell is not energized, and a liquid disposed over said roughened wall whereby said wall is made transparent to permit said cell to be energized, said liquid being vaporized at a critical temperature to make said wall translucent and deenergize said cell.

References Cited in the file of this patent
UNITED STATES PATENTS
2,197,190   Mott-Smith _____ Apr. 16, 1940
2,645,461   Brown et al. _____ July 14, 1953